(12) United States Patent
Olsen et al.

(10) Patent No.: US 7,752,330 B2
(45) Date of Patent: Jul. 6, 2010

(54) SYSTEM FOR LOW POWER OPERATION OF WIRELESS LAN INTERFACES

(75) Inventors: Claus Michael Olsen, Cortlandt Manor, NY (US); Jeffrey W. Clark, Cary, NC (US); Chandrasekhar Narayanaswami, Wilton, CT (US); Marcel-Catalin Rosu, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 11/927,572

(22) Filed: Oct. 29, 2007

(65) Prior Publication Data

US 2008/0052366 A1 Feb. 28, 2008

Related U.S. Application Data

(62) Division of application No. 10/419,656, filed on Apr. 21, 2003.

(51) Int. Cl.
*G06F 13/00* (2006.01)
(52) U.S. Cl. .................. 709/232; 709/230; 709/206; 455/574

(58) Field of Classification Search ............... 709/232, 709/235, 236, 217–219, 206, 230, 203; 455/574, 455/572
See application file for complete search history.

(56) References Cited

U.S. PATENT DOCUMENTS

| 5,991,287 | A * | 11/1999 | Diepstraten et al. | 370/338 |
| 7,209,949 | B2 * | 4/2007 | Mousseau et al. | 709/206 |
| 7,386,588 | B2 * | 6/2008 | Mousseau et al. | 709/205 |
| 2002/0120696 | A1 * | 8/2002 | Mousseau et al. | 709/206 |
| 2003/0187938 | A1 * | 10/2003 | Mousseau et al. | 709/206 |
| 2004/0255008 | A1 * | 12/2004 | Olsen et al. | 709/220 |
| 2007/0086471 | A1 * | 4/2007 | Igarashi et al. | 370/412 |
| 2008/0046547 | A1 * | 2/2008 | Olsen et al. | 709/220 |
| 2008/0052548 | A1 * | 2/2008 | Olsen et al. | 713/310 |

* cited by examiner

*Primary Examiner*—Kenneth R Coulter
(74) *Attorney, Agent, or Firm*—Michael J. Buchenhorner; Vazken Alexanian (57) ABSTRACT

A computer program product includes instructions for causing a processor to: alert a client of the configuration of said computer program product; use a memory space for buffering the network application data destined for the client; release the network application data to the client, based on at least one occurrence of a specified condition that promotes energy savings; and purposely delay at least some of said data with an amount of time greater than zero to promote energy savings.

10 Claims, 7 Drawing Sheets

SYSTEM FOR LOW POWER OPERATION OF WIRELESS LAN INTERFACES

This application is a division of co-pending, commonly-owned U.S. application Ser. No. 10/419,656, filed on Apr. 21, 2003, which is incorporated by referenced herein.

FIELD OF THE INVENTION

The invention disclosed broadly relates to the field of wireless communications, and more particularly relates to the field of power management in wireless local area networks (LANs).

BACKGROUND OF THE INVENTION

Figure 1:
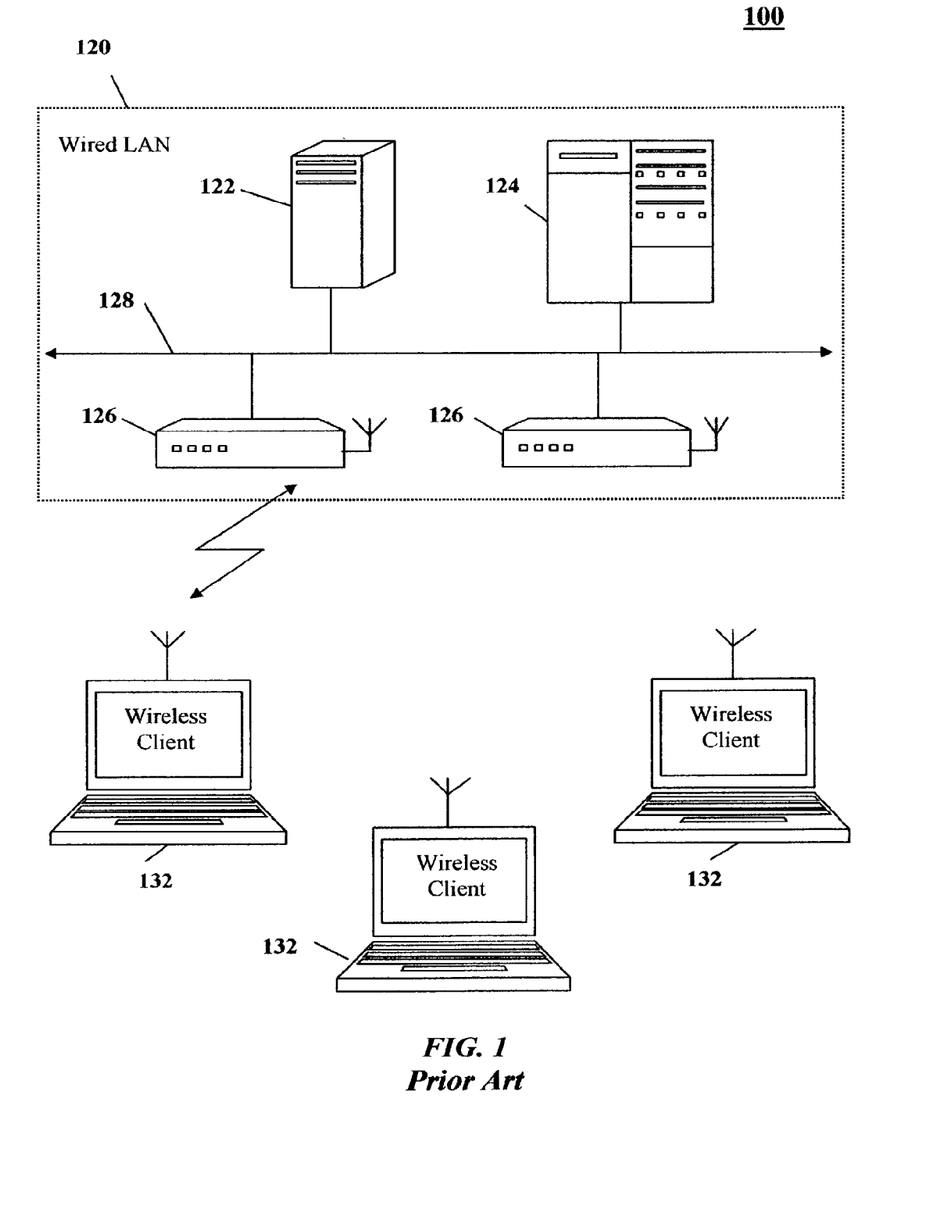
FIG. 1 is an illustration of a prior art wireless LAN system.

Referring to FIG. 1 there is shown an example of a known wireless LAN system 100 comprising a wired LAN 120 which comprises a LAN server 124 and a wired Client 122, both coupled to the LAN by a wireline bus 128. The system further comprises a plurality of access points (APs) 126 which are similar to base stations in a cellular system. Wireless Client Units 132 typically communicate with the access points 126 over the air in an unlicensed frequency such as the 2.4 GHz ISM (Industrial, Scientific and Medical) band. APs 126 are connected to an Ethernet hub or LAN server and transmit radio frequency signals over an area of up to a thousand feet which can penetrate walls and other non-metal barriers. Roaming users (e.g., Wireless Client Units 132) can be handed off from one access point 126 to another as in a cellular mobile phone system. Laptops use wireless modems that plug into an existing Ethernet interface or that are self-contained on PC cards, while stand-alone desktops and servers use plug-in cards.

Power consumption by mobile stations (wireless units) is a significant problem because these units are generally battery-powered, and to support wireless communication requires a level of power consumption that significantly reduces battery life, See for example E. Shih et al, "Wake on Wireless: An Event Driven Energy Saving Strategy for Battery Operated Devices," MobiCom 2002.

Before discussing an embodiment of the invention, we shall first present a summary of the IEEE 802.11 Wireless Local Area Network (WLAN) protocol, the two Power modes within this protocol and the dynamics of the WLAN system. Note that unless otherwise specified, whenever we mention the term power we are referring to the power consumption in the wireless interface, including host system power consumption directly related to running the wireless protocol. The power associated with other components in the client are excluded such as display power, power supply loss, and processor/memory power associated with executing other computing tasks.

The following background discussion addresses WLAN Clients (or STAs in 802.11 parlance) operating in the so-called "Infrastructure" mode in which an access point (AP) 126 connects the Wireless Client Units 132 to another network medium, typically a wired Ethernet medium. The role of the APs 126 is to synchronize the Wireless Client Units 132 on a common time base and to buffer packets on behalf of the Wireless Clients 132 as well as coordinate delivery of the packets to the Clients 132. Synchronization is maintained by a beacon signal which is launched by the AP 126 typically every 102.4 ms. Further, the AP 126 provides support for the Clients 132 operating in one of two power modes, namely the Constant Awake Mode (CAM) and the Power Save (PS) mode. In the CAM mode, Clients 132 are registered with the AP 126 as constantly being in the "Awake" state which means they must always be monitoring the wireless medium. Accordingly, the AP 126 may send packets to the Client 132 at any given time. Since the receiver of Client unit 132 is always on in the Constant Awake Mode, this mode also consumes the most power.

In the Power Save mode, Clients 132 are registered with the AP 126 as being in the "Doze" state between beacon signals and as "waking up" temporarily to receive selected beacon signals. The AP 126 must buffer packets destined for Clients 132 that are registered as being in the PS mode. The AP 126 informs Clients in PS mode if there are packets queued up at the AP 126 by including a Traffic Indication Map in the beacon signals that the Client 132 is expected to receive. In turn, the Client 132 in PS mode will poll the AP 126 to retrieve the queued-up packets.

Clients 132 operating in the PS mode may have significantly lower power consumption. Clients 132 can further reduce their power consumption by skipping beacon signals. Clients 132 may do so after first informing the AP 126 of their intention by passing a parameter known as the ListenInterval to the AP 126. This ListenInterval indicator is the interval between beacon signals in which the Client 132 intends to wake up and receive the beacon signal. For example, a ListenInterval of Nlisten=1, means that the Client intends to wake up to receive every single beacon signal. A ListenInterval of Nlisten=3 means that the Client 132 intends to wake up to receive every third beacon signal. The power consumption, Pdoze, in the wireless interface when the Client 132 is in the Doze state, is much less than power consumption when the Client 132 is in the Awake state, or Pawake. In the case where the time spent in the Doze state, or Tdoze, is much greater than the time spent in the Awake state, Tawake (when the beacon signal can be received), the average power consumption, P, follows this formula:

$$<P>=Pdoze+Pawake*Tawake/Tdoze$$

State-of-the-art power numbers are Pdoze=5 mW and Pawake=500 mW, and typically it takes Tawake=10 ms to receive a beacon signal. By extending the ListenInterval beyond 10, which increases Tdoze beyond 1 second, the power consumption of the Client 132 may be reduced by almost two orders of magnitude below the CAM mode.

One drawback of being in the Power Save mode is a significantly reduced network throughput since the Client 132 is not able to receive incoming packets as they arrive. Instead, the Client 132 must wait until it wakes up to receive the beacon signal, and then poll the AP 126 to receive the queued packets. At first sight this seems to impact only latency, which does not necessarily translate into a throughput reduction. The fact is, however, that throughput is severely impacted, as discussed in R. Krashinsky, H. Balakrishnan, "Minimizing Energy for Wireless Web Access with Bounded Slowdown," MobiCom 2002. The reason for this is rooted in the manner in which network application data are sent across a network from an origin server to a client. See, P. Barford, M. Crovella, "Critical path analysis of TCP transactions", IEEE/ACM Transactions on Networking, Vol. 9, No. 3, 2001, for a discussion on this issue.

Today, the predominant network protocol is the Transfer Control Protocol/Internet Protocol (TCP/IP) stack. See D. E. Comer, "Internetworking with TCP/IP: Volume I," Prentice Hall, 2nd Edition, 1991. In this stack, TCP ensures reliable data packet delivery between two TCP endpoints. An endpoint is defined as an IP address and TCP port number pair. An association of two distinct endpoints is called a TCP connection and the TCP protocol defines the mechanisms for establishing connections, for reliable data delivery, and for terminating connections. The TCP is a symmetric protocol (i.e., the same connection guarantees reliable data delivery in both directions; either one of the two endpoints can initiate the establishment or termination of a connection; and the protocol provides for simultaneous open and close). However, to simplify the discussion, we shall call the endpoints 'client' and 'server,' respectively, and refer to the data flow from the server to the client only.

Reliable data packet delivery is accomplished via two means. First, the client must acknowledge each DATA packet it receives from the server, typically one ACK packet (used to acknowledge the error-free receipt of transmitted data) for every two DATA packets. Secondly, the server will only send a limited number of DATA packets while allowing for the ACK packet(s) to be received later. The maximum number of outstanding, i.e. non-ACKed, data packets, expands according to a congestion window size (CWND) algorithm, as explained below. This algorithm, however, restarts for every new network connection that is established at the TCP level. To give an example of how all this works, assume that a File Transfer Protocol (FTP) session is established with an FTP server. Within the FTP application, the client may issue the command "get <file_name>" on the command connection, the first connection established between the FTP client and server. On execution of this command, a second TCP connection, called the data connection, is established between the client and the FTP server, and upon receipt of the entire file, the data TCP connection is torn down.

Assuming that the FTP service is configured to use passive-mode, (as most anonymous FTP servers and clients, such as Netscape, are configured today), the following describes the dynamics of the packet transfer between the client and the server as well as the CWND algorithm during the lifetime of the connection. To open the data connection, the client sends the first packet, called a SYN (synchronization) packet, to the server, to a port number that was previously provided by the server on the command connection. The server must respond immediately with a SYN packet, which must also acknowledge (ACK) the receipt of the client SYN packet. This server packet is called a SYN/ACK packet, because of its dual role.

At the same time, as part of the CWND algorithm, the server initializes its CWND variable to a value of one. The client acknowledges the SYN/ACK packet immediately, by sending an ACK packet. In TCP, all ACK packets are cumulative. Upon receipt of the ACK, the server increases its CWND by one, as specified by the CWND algorithm. In addition, the server will send two data packets (if the requested file is large enough). As long as no DATA or ACK packets are lost or reordered, the server increases its CWND by one for every ACK it receives, up to a very large limit, and it sends the maximum number of packets allowed by the current CWND, the last ACK, and the file size; the client sends an ACK packet for every two data packets it receives, or after a system-dependent timeout expires (typically 100 ms), if there is any unacknowledged data received. The CWND algorithm is substantially more complex, due to its handling of extraordinary events, such as packet loss and reorder or idle timeout expirations, when CWND is reduced, such as halved or reset to one, and its upper limit reset to a lower limit, such as its value before the event. In the interest of brevity, the descriptions of how TCP handles extraordinary events and of TCP connection termination are not included here, however those skilled in the art are familiar with these subjects.

As may be recognized from the above discussion, if the Client 132 is slow to receive the SYN/ACK packet, its transmission of the first ACK packet will be delayed. And then if the Client 132 is slow to receive the first two DATA packets it will also be slow to acknowledge them. As the CWND grows larger, and the instantaneous throughput increases, the AP 126 is queuing up an increasing number of DATA packets (up to the CWND number of packets). This is occurring while the Client 132 is in the Doze state. The Client 132 may then fetch packets very rapidly after the next beacon signal it receives (when it is in the Awake state). However, the total average throughput will suffer to an increasing extent with smaller file sizes due to the so-called "TCP slow start" phenomenon that is experienced in the very beginning of a new network connection, i.e. two DATA, then one ACK, then four DATA, then two ACKs, and so forth. It may also be seen that the smaller the ListenInterval is, the better the throughput is. But even for Nlisten=1 (i.e., the Client will receive every beacon signal), a DATA packet which is typically 1500 bytes takes only 1.1 msec to transfer across an 11 Mbps wireless interface. Thus, considering a typical beacon period of 102.4 msec and taking into consideration TCP, IP and medium-access control (MAC) protocol inefficiency, almost 50 DATA packets have to queue up at the AP 126 before the Client 132 in PS mode is no longer limiting the throughput, assuming the Client-Server connection bandwidth is limited by the speed of the wireless interface, i.e. 11 Mbps. Several other factors may further limit the maximum possible throughput. It should be noted that the maximum throughput of 50 maximum sized DATA frames per 102.4 ms beacon is based on measurements performed with an 802.11b wireless LAN client operating in the CAM mode and corresponds to a maximum throughput of 700 kilobytes per second (kByte/s), or about half the speed of the wireless interface itself. The inefficiency is mainly due to 802.11b protocol overhead. TCP/IP frame overhead also contributes.

There are two actions that may be undertaken to minimize the adverse effect on the throughput for a Client 132 in PS mode. First, whenever a DATA packet is detected, the Nlisten state is immediately reduced to minimal size in anticipation of more DATA packets to queue up at the AP 126. Second, the Client 132 in PS mode temporarily transitions into the CAM mode where it may remain for typically 100 ms, but could remain as long as 1 second. This temporary visit to the CAM mode will be referred to as the CAM timeout time, or Ttimeout. Typically, Ttimeout is reset to its original value, say 100 ms, after a DATA packet has been either transmitted or received.

By reducing Nlisten to 1, some improvement may be achieved in throughput. However, considering that the cumulative size of a typical web page is around 150 KB, only ⅓ of the maximum achievable throughput may be reached, due to the "TCP slow start" phenomenon mentioned earlier.

With respect to temporarily exploiting the CAM mode, this is an extremely effective method which, in some cases, may regain 100% throughput efficiency, even without a reduction in Nlisten. The reason is that as long as the Client-Server round trip time, Tround, is comfortably smaller than Ttimeout, the Client 132 will remain in the CAM mode due to resetting of Ttimeout on every DATA packet. That is, until no DATA packet has been either sent or received for a period of Ttimeout.

The problem with utilizing the CAM mode, even for brief moments such as 100 ms, is an increased power consumption if the Client-server bandwidth is smaller than the wireless bandwidth. As long as there are DATA packets being received, or sent, the Client 132 will remain in the CAM mode for another 100 ms. Therefore, if the overall throughput is slow, the Client 132 will spend excess time in the CAM mode waiting for DATA packets to arrive at the AP 126. As the Client-Server bandwidth decreases, the power efficiency decreases too. Typical Client-Server throughput on the world-wide web (WWW) is in the range of 25-150 kBytes/second depending on the particular server and its load and on the Client's browser. This throughput may be measured by a web sniffer (software and/or hardware that analyzes traffic and detects bottlenecks and problems in a network) such as IBM's PageDetailer.

It should be noted that there do exist solutions which attempt to increase the download throughput at the Client 132. One such solution is to combine web caching with web prefetching, where the server prefetches web data that a Client 132 is expected to request on the basis of the Client's request history. This methodology is denoted speculative prefetching. See X. Chen, X. Zhang, "A popularity-based prediction model for web prefetching", IEEE Computer, March 2003, for a discussion of prefetching. The efficiency of speculative prefetching, however, is not reliable, or predictable, on a per client basis. Speculative prefetching works best in proxy servers which host thousands of clients, and which see very high throughputs. Prefetching proxies also constantly have to revew pages as they time out, and therefore generate a significant amount of network traffic. It is therefore also beneficial for overall network performance if there are not too many of such proxies.

It should be further noted that the benefits of proxy servers to enhance and support the capabilities of clients is well known. See D. Gourley, B. Totty, "HTTP: The definitive guide", O'Reilly, 2002, for a good survey of proxy servers and how they function. Proxy servers have been developed for many purposes. Probably, the most well known types of proxy servers are the web cache proxy server and the security firewall proxy server. Other interesting types include proxies for transcoding content to better suit the capabilties of a certain device (such as a PDA), and filtering proxies for blocking access to inappropriate web sites. There are, however, no proxy servers that optimize for power consumption in the clients.

Finally, note that quite a bit of work has been done in the transport network layer, and below, to reduce power consumption. See, C. E. Jones, K. M. Sivalingam, P. Agrawal, J. C. Chen, "A survey of energy efficient network protocols for wireless networks", Wireless Networks, No. 7, 2001. These network level methods, however, do not replace or reduce the importance and benefits of a proxy server.

Therefore, current solutions do not manage to effectively reduce the wasted power consumption while the Client is waiting, or listening, for more data while in the CAM mode. Consequently, there is a need to further reduce consumption of power in mobile stations.

SUMMARY OF THE INVENTION

Briefly, according to an embodiment of the present invention, a computer program i product includes instructions for causing a processor to: alert a client of the configuration of said computer program product; use a memory space for buffering the network application data destined for the client; release the network application data to the client, based on at least one occurrence of a specified condition that promotes energy savings; and purposely delay at least some of said data with an amount of time greater than zero to promote energy savings.

DESCRIPTION OF THE PREFERRED EMBODIMENTS

Figure 2:
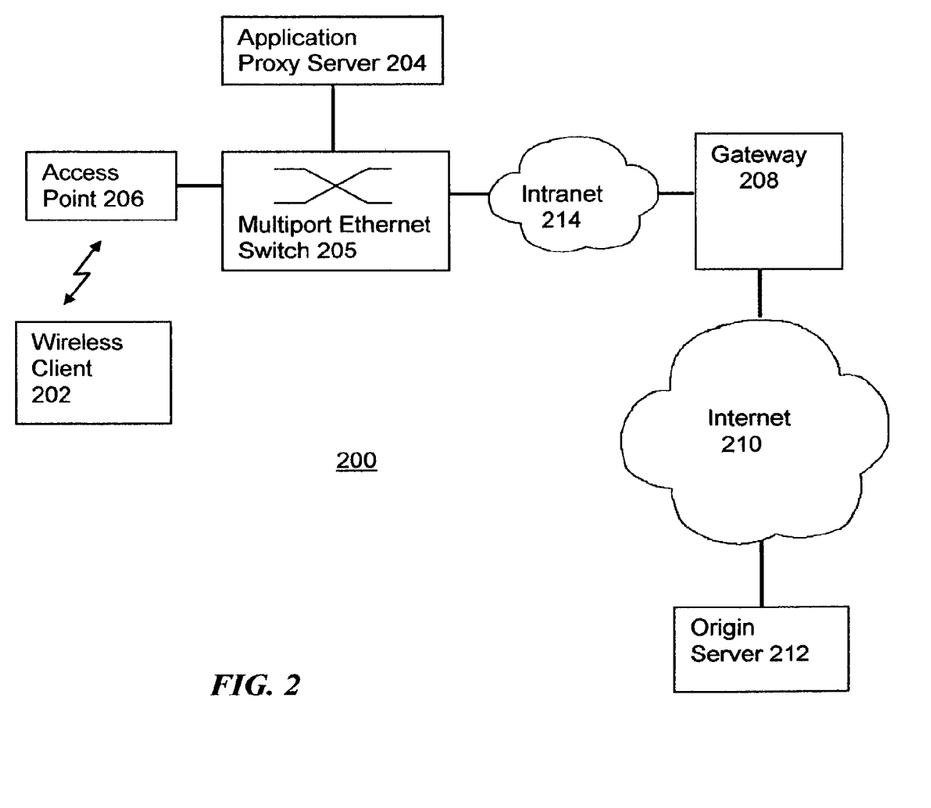
FIG. 2 shows a representation of a wireless LAN environment wherein a system in accordance with the invention can be advantageously used.

Referring to FIG. 2, there is shown a block diagram of a communication system or network 200 using a Proxy Server scheme, according to an embodiment of the invention. The system 200 comprises a plurality of wireless client units such as Wireless Client 202. These can be laptop computers, personal digital assistants or other wireless communication devices, wherein battery life is an important consideration. The Wireless Client 202 is connected to an Intranet 214 via an Access Point (AP) 206 that comprises a wireless transceiver for providing wireless communication with a Client 202. The AP 206 is often connected to the Intranet 214 through a Multiport Ethernet Switch 205 as shown in FIG. 2. According to the invention, an Application Proxy Server 204 is also connected to the Intranet 214 and to the AP 206 through the Multiport Ethernet Switch 205.

The Intranet 214 is connected to the Internet 210 via a Gateway 208. Also connected to the Internet 210 is a Server 212 (called an Origin Server herein). The network 200 uses the TCP/IP protocol to exchange packets.

Figure 3:
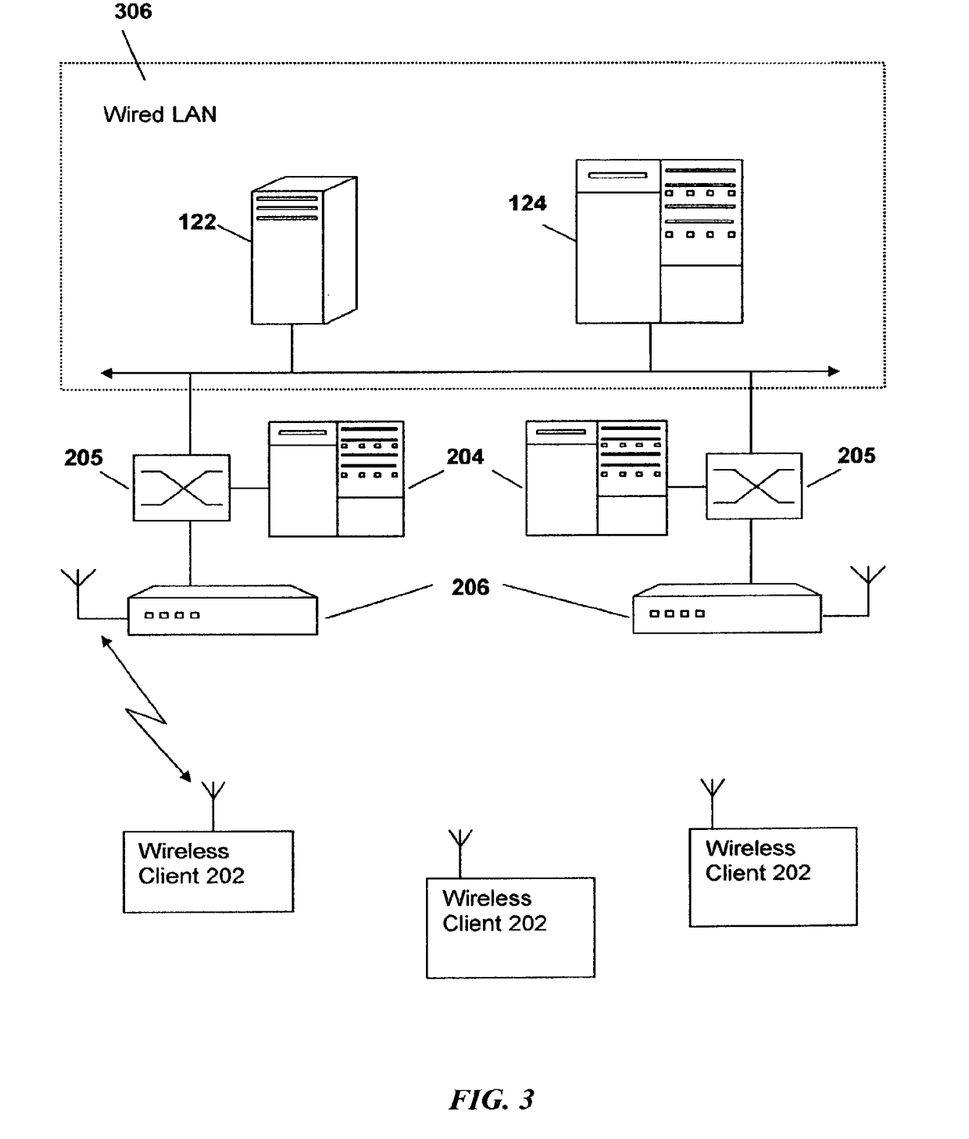
FIG. 3 shows a more detailed representation of a portion of the network shown in FIG. 2.

Referring to FIG. 3, there is shown an illustration of a more detailed block diagram of the network 200, according to an embodiment of the invention. The Intranet 214 is shown as a Wired LAN 306 such as the one discussed with respect to FIG. 1 except that it now includes a plurality of application Proxy Servers 204 each connected to the AP 206 and the rest of the Wired LAN 306 through Multiport Ethernet Switches 205. The Wireless Clients 202 are also different from those shown in FIG. 1 in that they are adapted to use the services of the Proxy Servers 204.

In this embodiment we shall discuss an 11 Mbps IEEE 802.11b wireless LAN, which limits the maximum Client-Server application bandwidth, or throughput, to about 750 kBytes/s. However, those skilled in the art will appreciate that the principles of the invention may be used in other embodiments including other 802.11 systems, and other wireless and wired communication systems. The Proxy Server scheme works by prefetching application data from the Origin Server 212. This causes data to accumulate in the Proxy Server 204 until the wireless Client 202 is able to retrieve the data and until the Proxy Server 204 releases the data. In this fashion, the Client 202 is not required to communicate with the Origin Server 212 in the CAM mode, as now this task is handled by the Proxy Server 204. The Client 202 still has to wait for data packets from the Proxy Server 204 in the CAM mode. But since the Client-Proxy bandwidth (e.g. 750 kBytes/s) is much greater than the Client-Origin Server bandwidth (e.g. 25-150 kBytes/s), the Client 202 may retrieve data packets about 5-30 times faster from the Proxy Server 204, and therefore spend up to 5-30 times less time in the CAM mode, thereby reducing energy consumption.

Furthermore, assuming the Client 202 is aware of the presence of the Proxy Server 204, the Client 202 may adjust its own Ttimeout to be very small since it knows that the response time of the Client-Proxy connection is very high, due to the high Client-Proxy bandwidth. The only factor that may really impact the response time is the wireless network itself, e.g. due to contention or data loss. Communicating via the AP 206 and the Proxy Server 204 will be fast in comparison to communicating directly with the Origin Server 212. In the preferred embodiment it will be assumed that Ttimeout=25 ms. The net effect of all this is that the Client 202 may significantly reduce energy consumption while in the CAM mode. According to an aspect of the invention, the Client 202 is configured to detect the presence of the Proxy Server 204 and to adjust its Ttimeout according to whether the Proxy Server 204 is available to cache messages or not.

The Proxy Server 204 operates at the application level. In a preferred embodiment a web browser application is used. So in this case, the Proxy Server 204 is a web proxy which uses HyperText Transfer Protocol (HTTP) to retrieve web pages and objects from the Origin Server 212. Similarly, the Client 202 uses HTTP to retrieve web pages and objects from the Proxy Server 204.

Figure 4:
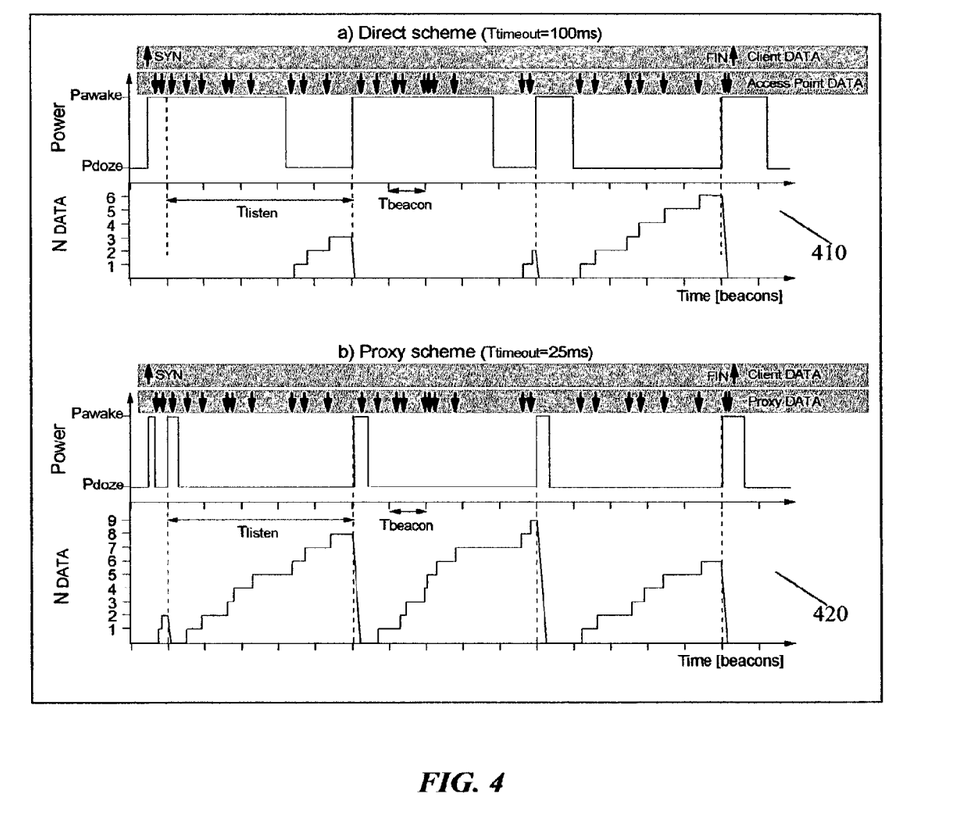
FIG. 4 shows a graphical representation of power consumption using a direct scheme, according to the prior art, and the proxy scheme, according to an embodiment of the invention.

Referring now to FIG. 4 we see two charts 410 and 420, illustrating the dynamic power consumption (Power) in the Wireless Client's 202 WLAN interface and the number of accumulated DATA packets, $N_{DATA}$, in two different systems: 1) when the Client 202 is connected directly to the Origin Server 212, as shown in the Direct scheme 410; and 2) when the Client 202 is making use of the Proxy scheme 420. SYN and FIN represent the initial Client 202 TCP connection request packet and the final Client 202 TCP connection packet, respectively. The remaining "down" arrows (⇓) indicate the arrival of DATA packets a) at the Access Point 206 and b) at the Proxy Server 204. Other packets, such as SYN/ACK and ACK packets, are not shown. In both cases Nlisten=5 (the Client 202 will receive every fifth beacon signal).

As may be seen from FIG. 4, in the Proxy Scheme 420, the Proxy Server 204 accumulates packets at whatever speed they may arrive at the Proxy Server 204. In the meantime, the Client 202 is in the Doze state saving energy. Then, when the Client 202 wakes up, it transitions into the CAM mode on detection of the first DATA packet. It then retrieves all buffered packets, depleting the Proxy Server 204 buffer as fast as possible. It then waits for Ttimeout=25 ms in the CAM mode, and if no more DATA packets are transmitted by the AP 206 it returns to the Doze state.

The Web Proxy Server helps reduce the Client 202 power consumption in at least two ways. First, by splitting the TCP connection between client and server into two separate connections, Client-Proxy and Proxy-Server. This split buffers the Client 202 from the negative effects that wide-area network conditions (e.g., limited bandwidth, high latency, packet loss) have on the packet dynamics and its impact on the Ttimeout selection. The benefits of splitting the TCP connections at the Proxy Server 204 apply to any TCP traffic that is mostly unidirectional, towards the Client 202.

Figure 5:
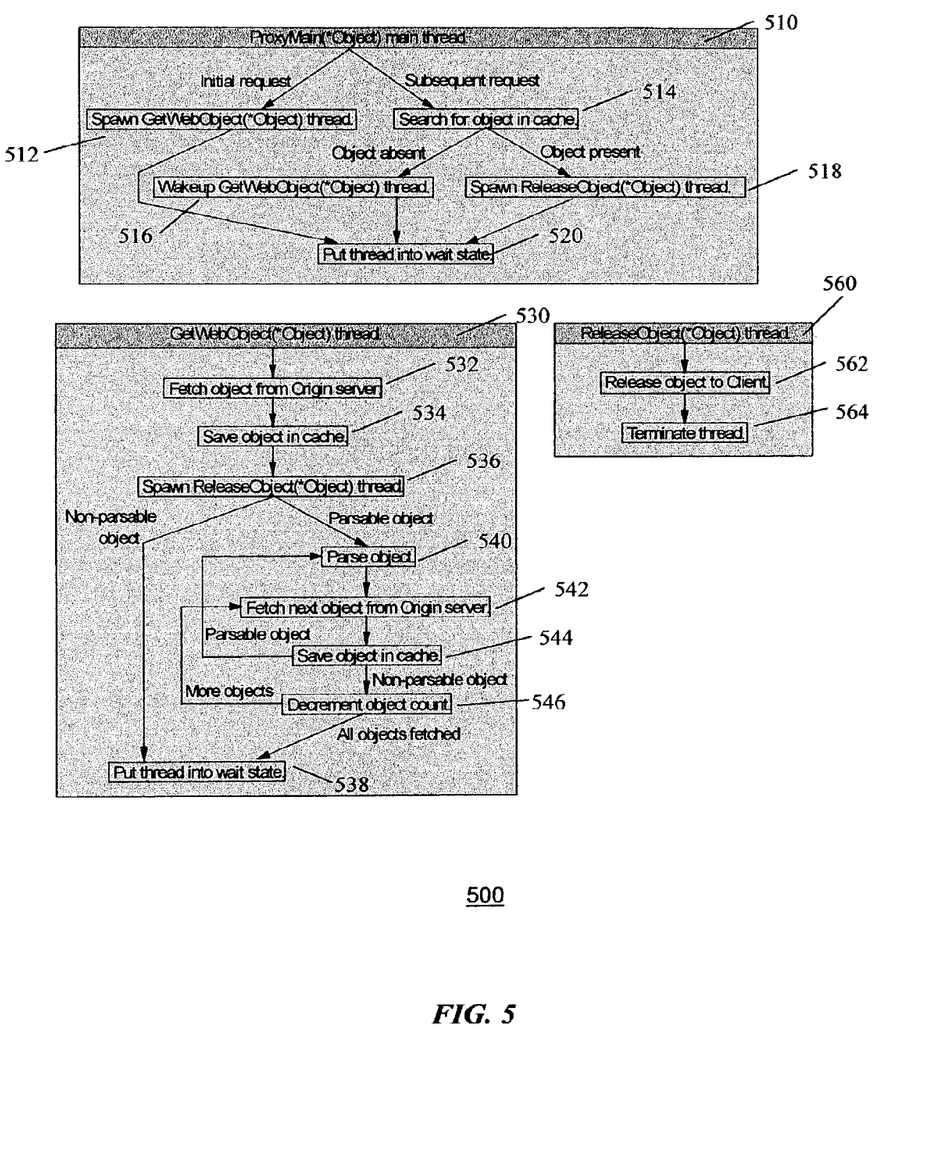
FIG. 5 shows a flowchart of Web page retrieval using a Proxy Server, according to an embodiment of the invention.

The second benefit is specific to Web content and it is illustrated in FIG. 5 which shows a flowchart 500 detailing the process of retrieving and releasing a web page. More specifically, the second benefit stems from the way web pages are constructed, with a main page which may include several other objects embedded in this page. The process begins at step 510 with the receipt of an HTTP request from the Client 202 which wakes up the main thread, ProxyMain(*Object). In case of the initial HTTP request, the Web Proxy Server spawns the GetWebObject(*Object) thread in step 512 which fetches the object from the Origin Server 212. Note that *Object is a pointer to the HTTP request header string. The header includes the Origin Server 212 name, the path name of the object/page, and the cookie, among other things. In case of a subsequent client HTTP request (e.g. the Client 202 requests an embedded image in the main HTML page), it is first determined in step 514 if the object has already been fetched and therefore present in the cache. If the object is absent in the cache then in step 516 the GetWebObject( ) thread is woken up. If the object is present in the cache then in step 518 the ReleaseObject(*Object) thread is spawned, releasing the object to the Client 202. The thread is then put into a wait state in step 520.

Step 530 is the GetWebObject(*Object) thread. This thread fetches the object from the Origin Server 212 in step 532, saves it in cache in step 534 and then spawns the ReleaseObject(*Object) in step 536 to release the object to the Client 202. Next, it is determined if the object is parseable. In case of a non-parseable object, the thread is put into a wait state in step 538. In case of a parseable object, such as an HTML page or Java script, the object is parsed in step 540 and the number of embedded objects is counted. Next, in step 542, the next object is fetched from the Origin Server 212 and then saved in cache in step 544. If the current object is parseable, execution returns to step 540. If the current object is not parseable, the object count is decremented by one in step 546. If there are more objects to prefetch, then execution returns to step 542. When all objects have been prefetched, the thread is put into a wait state in step 538.

Step 560 is the ReleaseObject(*Object) thread which releases the object to the Client 202 in step 562 and then terminates the thread in step 564.

Note that ReleaseObject( ) threads are always spawned and immediately terminated upon complete transfer of an object. This enables the Proxy Server 204 to accept multiple successive Client 202 requests, i.e. pipelined requests, in step 510. The ReleaseObject( ) threads synchronize with each other during servicing of pipelined requests to conform to the HTTP protocol specifications.

Note that step 532 assumes that the object has not already been received in an earlier request. If the object is already in cache, then step 532 may simply fetch the object from cache, skip step 534 and jump to step 536.

Note that the flowchart 500 shown in FIG. 5 accounts for releasing web objects based on the condition of receiving the entire object. In general, web data may be released on other conditions as well. For example, another condition could be to release web data based on exceeding a certain amount of buffer space. Yet another condition could be to release web data based on a timeout. In both cases, the Proxy Server 204 could start releasing web data before it has received an entire object.

The number of embedded objects may vary from a few to more than one hundred and depends on the Web page content and the Web design tool(s) used. When handling pages with embedded objects, the Proxy Server 204 may attempt to emulate some of the client actions with respect to parsing the main page and requesting the embedded objects. For example, it is up to the particular implementation of a web browser in which order embedded objects are requested. The same holds true for objects manifesting themselves as a result of executing other embedded objects. Since, in principle, the Proxy Server 204 may know which web browser a Client 202 is using, the Proxy Server 204 can adjust its prefetching policy accordingly to better match the subsequent sequence of requests from the Client 202.

While the prefetch actions occur, the Client 202 may remain in the Doze state for a longer period and occasionally wake up to determine if there are packets queued up at the Proxy Server 204. Once the main page is retrieved by the Client 202, it is very likely that the Client 202 stays in the Awake state until it has received all currently released objects from the Proxy Server 204 and that this time interval (Tawake) is significantly shorter than in the non-proxy configuration, as the embedded objects are served from the local Proxy Server 204 cache. Furthermore, the Client 202 will return to the Doze state soon after the last object is retrieved, since the Client 202 can be configured with a low Ttimeout value as packet transfers occur across the low-latency Client-Proxy connection.

The Client 202 must be configured (programmed or wired) to detect the presence of the Web Proxy. This is important because the Power Management (PM) mechanism in the Client 202 will depend upon the expectations to the Client-Server latency and server properties as explained earlier. This may be done as follows. In the Client 202 a ProxySniffer( ) daemon is using a UDP port. Occasionally, it will broadcast a sniff packet on an agreed upon UDP port and then wait for a response. The sniff packet may contain information about the browser's capabilities and configuration. On the Web Proxy, an Alert( ) daemon is listening on the agreed upon UDP port. When it detects the sniff packet from the Client 202 it responds with its IP address, TCP port and capabilities. In turn, the Client 202 then configures the Web browser application to use the Proxy Server 204. Secondly, the Client 202 selects a suitable Power Management (PM) scheme for the wireless LAN interface. One such suitable PM scheme is to set Nlisten=5 (i.e. 512 ms) and Ttimeout=25 ms in the MAC network layer. In order to enable the changes in the PM scheme, the Client 202 must be able to share Proxy Server 204 information with the MAC. This is described later. Note that to prevent the sniff packet from propagating to proxies belonging to other APs, each Proxy Server 204 should be on a different IP subnet, since broadcast packets do not propagate across subnets.

The Client 202 should also be able to determine if there are any application network sessions or not. By definition, application session context is only known within each application. However, by sharing the session context with the MAC network layer, a more suitable PM scheme may be selected. One such suitable PM scheme is to set Nlisten=100 as opposed to Nlisten=5 when the Client 202 is not connected with a server, since there is no reason why the Client 202 should wake up to receive the beacon signal every 5 beacons, as there will never be any packets queued up at the AP 206. In fact, the WLAN interface may be completely shut down, and then started up again when the user clicks on a hyperlink. Note that such optimizations are possible only when the Client 202 doesn't run any server-like applications, i.e., applications listening to specific TCP/UDP ports for commands. If the Client 202 runs server-like applications, the above optimizations can still be used if the clients of these applications can tolerate (extremely) large response times.

The following discussion describes how to retrieve the application session context and how to transmit the session and Proxy contexts to the MAC layer and how to reflect the Proxy context in the network settings of the Web browser.

Retrieving the Application Network Session Context.

In the Client 202, a SessionContext( ) module hooks into the TCP protocol layer where it intercepts communication on all the relevant ports, to determine when a connection is opened and closed, by intercepting all communication with the IP network layer. SessionContext( ) also needs to know which application is associated with each port which may be retrieved from known system configuration files or databases. Those skilled in the art of network programming will know how to implement the SessionContext( ) module. Also, tools for retrieving network context are commercially available. For example, the network context can be made available at the user level on a Linux client using shell commands such as 'netstat –t', which lists all the TCP connections of the client, their state, and receive and send queue sizes.

Communicating Context to MAC Driver.

Communicating the context from ProxySniffer( ) and SessionContext( ) to the MAC driver is known to anyone skilled in the art of enabling software modules, or software components, to exchange data. See for example J. Richter, "Advanced Windows," 3rd Edition, Microsoft Press, 1997 and A. Rubini, J. Corbet, "Linux Device Drivers," 2nd Edition, O'Reilly, 2001.

Reflecting Proxy Context in Web Browser Network Settings.

Reflecting the Proxy context, most importantly the IP address of the Proxy Server 204, in the Web browser is known to anyone skilled in the art of systems programming. For example, under Microsoft Windows™ it is a matter of updating the particular key in the Windows Registry which holds the address of a Proxy Server 204. Also the particular key that instructs the browser to use a Proxy Server 204 in the first place must be enabled, or disabled if the Proxy Server 204 disappears. Finally, the Web Browser's configuration utility must be toggled in order to detect the modifications made to the Windows Registry keys.

In general, web browsers, and other network applications, do not allow other software components to trigger the toggling of their configuration utility. Consequently, the client will continue using the same proxy, which is no longer the optimal proxy, until the user happens to restart the browser. A remedy for this is to use a technique known as Network Address Translation (NAT) at the IP protocol level. By inserting a NAT function into the IP software layer which intercepts all packets, the NAT function can manually insert the proper proxy IP address. In order for this to work the NAT function also needs to know which TCP port the Browser is using so the NAT function can properly isolate browser originated packets. The mapping of TCP port number versus network application is readily accessible in any Operating System's configuration database, such as the Microsoft Windows Registry.

Those skilled in the art will realize that the Web Proxy could also be an Email Proxy or any other network application Proxy.

Those skilled in the art will realize that the Proxy 204 could also be integrated with the Access Point 206, and that the Proxy Server 204 could be located anywhere else on the Intranet 214, or even on the Internet 210. What is important for the sake of reducing power is that there is a high-speed connection between the Wireless Client 202 and the Proxy Server 204. Therefore, the closer to the Access Point 206 the Proxy Server 204 is, the higher is the connection bandwidth between the Client 202 and the Proxy Server 204.

Figure 6:
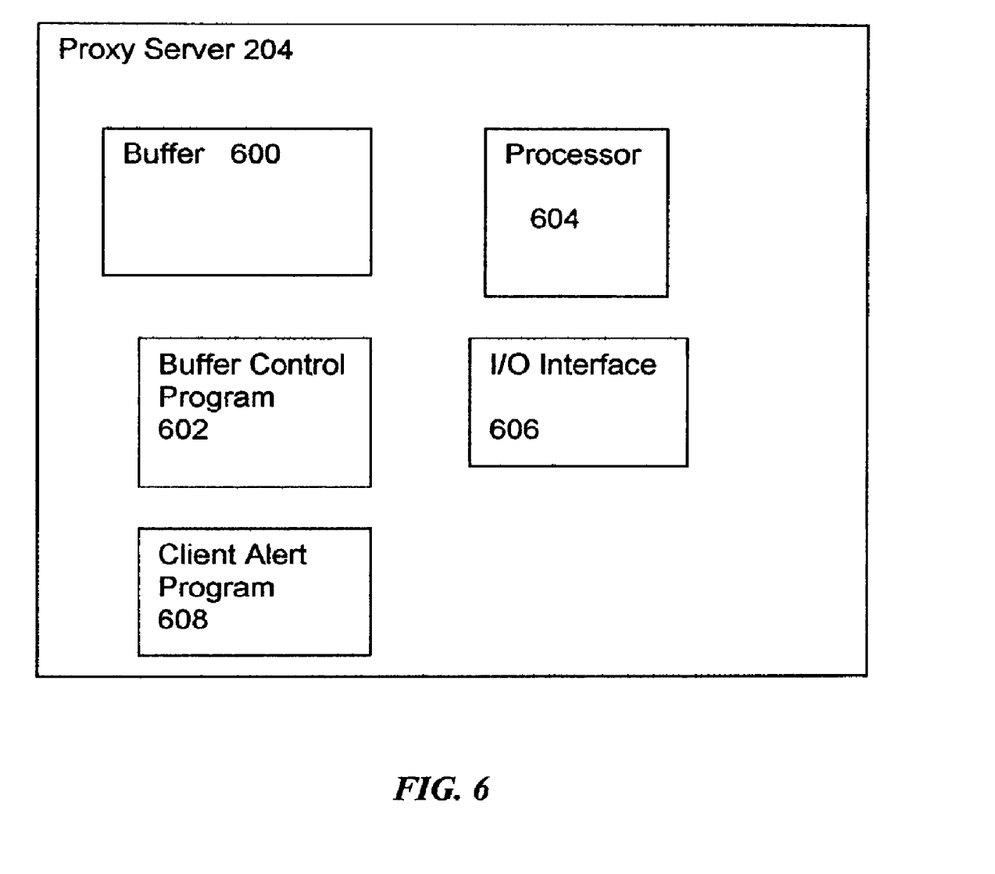
FIG. 6 shows a simplified block diagram of an Application Proxy Server, according to an embodiment of the invention.

Referring now to FIG. 6, the Proxy Server 204 comprises a Buffer 600 for storing data (or other information) destined for a Client unit 202. The Buffer 600 is a part of the system memory (RAM) of the Proxy Server 204, controlled by a Buffer Control Program 602. A Client Alert Program 608 informs clients of the IP address and other capabilities of the Proxy Server 204. The Buffer Control Program 602 and the Client Alert Program 608 can be implemented as software which executes on a Processor 604. An Input/Output (IO) Interface 606 will enable communication with clients and other information processing systems. The Proxy Server 204 operates at the network application level, or more specifically at the layer 5 and above the Open System Interconnection (OSI) ISO standard. In the preferred embodiment, we shall assume a Web Browser application. So in this case, the Proxy Server 204 is a Web Proxy which uses HyperText Transfer Protocol (HTTP) to retrieve web pages and objects from the Origin Server 212. Similarly, the Client 202 uses HTTP to retrieve Web pages and objects from the Proxy Server 204.

According to another embodiment of the invention the Proxy Server 204 comprises software configured to delay processing at least some of the data buffered for a client for an amount of time greater than zero based on detected operating parameters of the client. The operating parameters comprise the type of device that the client is such as a mobile telephone or a wireless laptop or palmtop or the operating system used. The Proxy Server 204 can detect these operating parameters by analyzing signals received from the Client 202. The parameters can be expressly stated in for example metadata or can be inferred from the type of signal received (e.g., the protocol used). The Proxy Server 204 can be programmed to adjust the processing delay by predetermined amounts of time according to the detected parameters.

Figure 7:
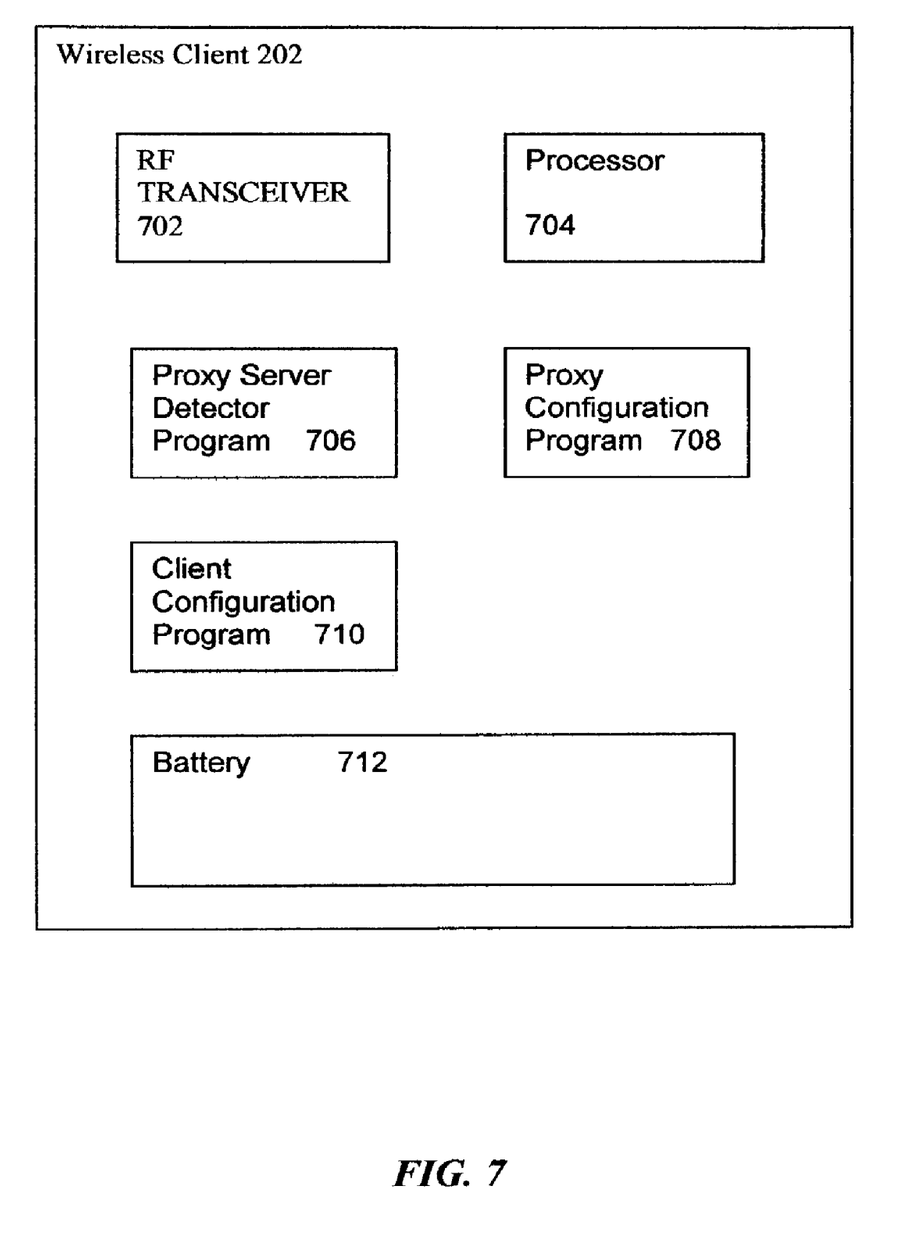
FIG. 7 shows a block diagram representation of a wireless client, according to an embodiment of the invention.

FIG. 7 shows how a Wireless Client 202 may be configured according to an embodiment of the invention. A Wireless Client 202 may be configured with components to include a radio-frequency (RF) Transceiver 702, a Processor 704, a Proxy Server Detector Program 706, a Proxy Configuration Program 708, and a Client Configuration Program 710. A Battery 712 will also be part of the configuration.

Therefore, while there has been described what is presently considered to be one or more preferred embodiments, it will be understood by those skilled in the art that other modifications can be made within the spirit of the invention.

The invention claimed is:

1. A computer program product embodied on a computer readable storage medium of a proxy server comprising instructions for causing a processor to:

in a communication system comprising a server, a client, and the proxy server, split a transmission control protocol connection between the client and the server into two separate connections: a client-proxy connection and a proxy-server connection;

alert a client of the proxy server of a configuration of said computer program product;

use a memory space for buffering network application data destined for the client;

release the network application data to the client, based on at least one occurrence of a specified condition that promotes energy savings; and delay the release of at least some of said data with an amount of time greater than zero to promote energy savings.

2. The computer program product of claim 1, comprising instructions for causing the processor to: receive configuration instructions specifying the at least one occurrence of a specified condition for release of the network application data; allocate memory space for storing the configuration instructions; wherein at least one processor is configured to execute the configuration instructions.

3. The computer program product of claim 1 wherein the specified condition comprises exceeding a buffer threshold.

4. The computer program product of claim 1 wherein the specified condition comprises ending of an application data stream.

5. The computer program product of claim 1 wherein the specified condition comprises receipt of at least one object.

6. The computer program product of claim 1 wherein the specified condition comprises expiration of a specified period of time.

7. The computer program product of claim 1 wherein the network application data comprises one of a group consisting of: email data; web page data; net meeting data; instant messaging data; and database synchronization data.

8. The computer program product of claim 1 wherein the proxy server is integrated with an access point for a wireless network.

9. The computer program product of claim 1 wherein the proxy server apparatus is adapted to serve a plurality of clients.

10. The computer program product of claim 1 further comprising an emulation system for emulation of network applications.

* * * * *